United States Patent
Shirai et al.

Patent Number: 5,995,592
Date of Patent: Nov. 30, 1999

[54] PORTABLE TELEPHONE UNIT AND INDICATION ADAPTER

[75] Inventors: Kazuhiko Shirai; Shoji Nagai, both of Tokyo, Japan

[73] Assignee: Sony Corporation, Tokyo, Japan

[21] Appl. No.: 08/634,392

[22] Filed: Apr. 18, 1996

[30] Foreign Application Priority Data

Apr. 20, 1995 [JP] Japan ................................ 7-119099

[51] Int. Cl.⁶ .................................................. H04Q 7/20
[52] U.S. Cl. ........................ 379/56.3; 455/566; 455/575; 455/90; 359/154
[58] Field of Search .................................. 455/403, 420, 455/550, 566, 575, 90, 414, 415; 379/56.1, 56.2, 56.3, 428, 110.01; 359/142, 145, 146, 154

[56] References Cited

U.S. PATENT DOCUMENTS

| | | | |
|---|---|---|---|
| 4,456,793 | 6/1984 | Baker et al. | 379/56.3 |
| 4,490,584 | 12/1984 | Lucey | 379/56.3 |
| 5,138,649 | 8/1992 | Krisbergh et al. | 455/575 |
| 5,241,410 | 8/1993 | Streck et al. | 379/56.3 |
| 5,446,783 | 8/1995 | May | 379/56.3 |
| 5,659,890 | 8/1997 | Hidaka | 455/556 |
| 5,752,195 | 5/1998 | Tsuji et al. | 455/415 |
| 5,835,732 | 11/1998 | Kikinis et al. | 455/556 |
| 5,835,862 | 11/1998 | Nykanen et al. | 455/556 |

*Primary Examiner*—Dwayne D. Bost
*Assistant Examiner*—Nay A. Maung
*Attorney, Agent, or Firm*—Jay H. Maioli

[57] ABSTRACT

An IR emitting device and an IR receiving device are employed to transmit data to and receive data from a public telephone network. As a result, the user interface of the portable telephone unit for non-voice communication service is improved.

5 Claims, 2 Drawing Sheets

FIG. 3A
100
RECEIVING ROUTINE
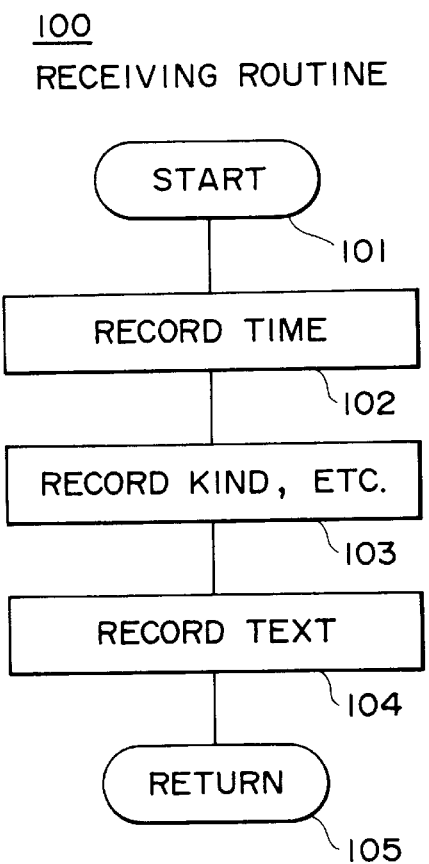
FIG. 3B
200
INDICATION ROUTINE
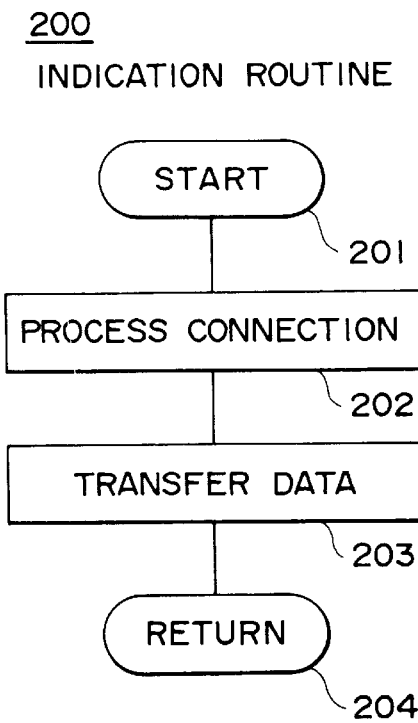
FIG. 4
|  | TIME | TRANSMISSION | KIND |
|---|---|---|---|
| >>> | 08:15 AM | 03-5448-3311 | FAX |
|  | 09:23 AM | 052-232-2611 | SMS |
|  | 01:47 PM | 06-251-5111 | E-MAIL |
18 LCD

PORTABLE TELEPHONE UNIT AND INDICATION ADAPTER

BACKGROUND OF THE INVENTION

1. Field of the Invention

The present invention relates to a portable telephone unit.

2. Description of Related Art

Along with advances in communication network services, non-voice communication services (non-telephone communication service) such as short message service (SMS), image information including facsimiles, and personal computer communication have been popularized. Since the operating systems have been advanced or complicated, it is necessary to improve the operability of the terminal equipment.

However, portable telephone units have been reduced in size more and more to take advantage of their portability and, as a result, they suffer from restriction regarding the number and the size of operation keys, indication area or resolution of display.

Moreover, conventional portable telephone units are not well adapted for use as a terminal for the non-voice communication service described above.

SUMMARY OF THE INVENTION

An object of the present invention is to overcome the foregoing problems.

The portable telephone unit according to the present invention comprises a transmitter/receiver circuit, a first control means for controlling the operation of the transmitter/receiver circuit and transferring data signals between it and the transmitter/receiver circuit, a first light emitting device for converting data signals supplied from the control means into optical signals and a second light receiving device for converting the optical signals into data signals and supplying the same to the control means, in which data transmitted/received between a public network and the transmitter/receiver circuit can be transmitted/received through the light emitting device and the light receiving device with respect to external equipment.

The portable telephone apparatus according to the present invention comprises a portable telephone unit including a transmitter/receiver circuit, a first control means for controlling the operation of the transmitter/receiver circuit and transferring data signals between it and the transmitter/receiver circuit, a first light emitting device for converting data signals supplied from the control means into optical signals and a first light receiving device for converting the optical signals into data signals and supplying them to the control means, and an indication adapter including an indicator, a second control means for controlling the indication on the indicator, a second light receiving device for converting the optical signals from the first light emitting device into data signals and supplying them to the second control means, and a second light emitting device for converting data signals supplied from the second control means into optical signals to be sent to the first light receiving device, in which the data received by the portable telephone unit from the public network can be supplied to and indicated on the indication adapter by way of the first light emitting device and the second light receiving device, and the data processed in the indication adapter can be supplied passing through the second light emitting device and the first light receiving device to the portable telephone unit to thereby supply them from the portable telephone unit to the public network.

BRIEF DESCRIPTION OF THE DRAWINGS

FIGS. 3A and 3B are flowcharts illustrating an example of a processing routine; and FIG. 4 is a view showing an example of an indication.

DESCRIPTION OF THE PREFERRED EMBODIMENTS

Figure 1:
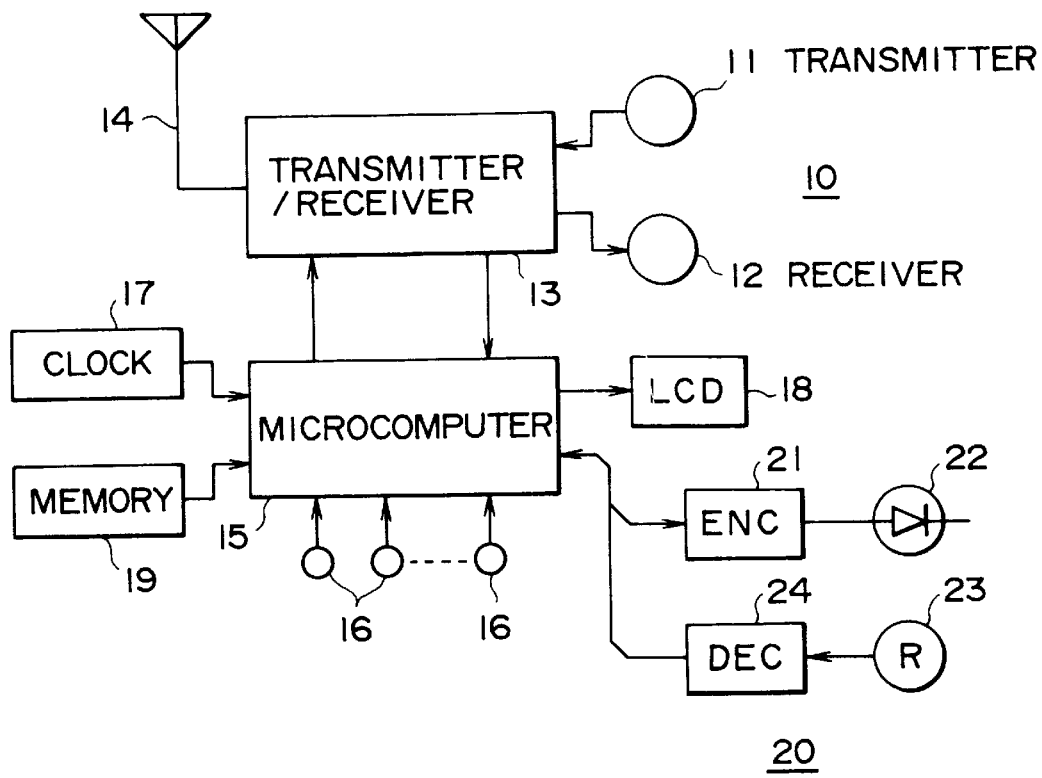
FIG. 1 is a system chart illustrating one embodiment of the present invention.
Figure 2:
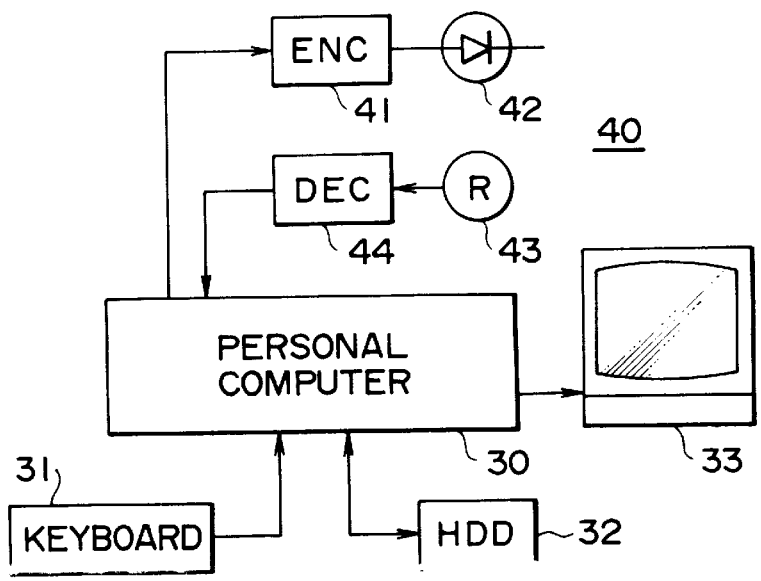
FIG. 2 is a system chart illustrating another embodiment of the present invention.

FIG. 1 illustrates an example of a portable telephone unit 10 according to the present invention and FIG. 2 illustrates an example of an indication adapter including a personal computer used in combination with the portable telephone unit 10.

The portable telephone unit 10 comprises a transmitter 11, a receiver 12, a transmitter/receiver circuit 13, and a transmitting/receiving antenna 14. Voice signals from the transmitter 11 are converted in the transmitter/receiver circuit 13 into predetermined transmission signals, and the transmitting signals are transmitted by way of the transmitting/receiving antenna 14 to a base station. Further, signals transmitted from the base station are received by the transmitting/receiving antenna 14, and the received signals are supplied to the transmitter/receiver circuit 13 to supply voice signals of a person in communication to a receiver 12.

The portable telephone unit 10 comprises a microcomputer 15 for controlling the system. The transmitter/receiver circuit 13 is controlled by the microcomputer 15, and various control commands and data pass between the telephone and the base station through the transmitter/receiver circuit 13. Various operation keys 16, clock circuit 17, and LCD 18 are connected to the transmitter/receiver circuit 13.

Particularly, in the present invention, a receiving routine 100 and an indication routine 200 are disposed, for example, as shown in FIG. 3 as a portion of a processing program to the microcomputer 15. Further, data holding memory 19 is also connected with the microcomputer 15.

Further, the portable telephone unit 10 has a communication circuit 20 for both way data communication with an indication adapter 30 by way of infrared rays. That is, data from the microcomputer 15 is supplied to an encoder 21 and encoded into a predetermined format of transmission signals, and the signals are supplied to an infrared light emitting device, for example, an IR LED 22 and then inverted into infrared light and subsequently transmitted to the indication adapter including the personal computer 30 as described later.

IR light transmitted from the indication adapter including the personal computer 30 is received by an IR receiving device 23 and converted into signals and the received signals are supplied to a decoder 24 and decoded into original data, and the data is incorporated into the microcomputer 15.

On the other hand, the indication adapter including the personal computer 30 conduct two way data communication with the portable telephone unit 10 to indicate the received data on a display. That is, in this embodiments the indication adapter comprises a personal computer 30 to which are connected a keyboard 31 as an input means, hard disk device 32 as an external memory device and, CRT display 33 as an indication means.

Further, the personal computer 30 is provided with a communication circuit 40 as peripheral equipment for two way data communication with the communication circuit 20 by way of IR light. That is, data from the personal computer 30 is supplied to an encoder 41 and encoded into transmission signals of a predetermined format and the signals are supplied to an IR emitting device, for example, IR LED 42 and converted into IR light and transmitted to the portable telephone unit 10.

IR light transmitted from the portable telephone unit 10 is received by IR receiving device 43 and converted into signals. The received signals are supplied to decoder 44, decoded into original data and which is incorporated into the personal computer 30.

With the constitution described above, when the portable telephone unit 10 receives data such as of SMS, facsimile service or electronic mail by way of a public network, processing in the CPU (not shown) of the microcomputer 15 starts from step 101 (FIG. 3A) in a receiving routine 100 and, at the next step 102, data indicative of receiving time are read out from a clock circuit 17 and supplied to a memory 19 and stored in the memory 19.

At step 103, data such as an identification code indicative of a data transmitting person, when provided by the person is received, as well as data indicative of the kind of the received data, namely, indicating whether the received data is SMS, facsimile or electronic mail. This data is stored in the memory 19. At step 104, when a text of the received data is received, the text data is also stored in the memory 19.

Then, when all the data has been received and recorded, the processing terminates at step 105. Thus, when the data is transmitted through the public network, the data is stored in the memory 19.

When a user of the portable telephone unit 10 operates a predetermined key among the operation keys 16, data stored in the memory 19 is read out therefrom and the read out data is supplied to the LCD 18. The LCD 18 indicates, for example, as shown in FIG. 4, the received time for the data, the name of the transmitting person (telephone No. or identification code) and the kind of data. (Fax, SMS, E-mail, etc.). A predetermined number of data sets can be displayed simultaneously—for example, up to three symbol ">>>" represents as a cursor at the top (left) of FIG. 4 of the receiving time for the received data as an object of the subsequent processing.

If there are more than three items or set of the received data, the display on the LCD 18 can be scrolled up or down by the operation of a cursor key including among the operation keys 16. Accordingly, index information such as receiving time can be indicated for any received data by use of the scrolling operation.

Then, when a transmission key among the operation keys 16 is operated during indication of the index information, processing in the microcomputer 15 is started by the CPU from step 201 of an indication routine 200 FIG. 3B and then a predetermined connection protocol is executed at step 202 between the microcomputer 15 and the personal computer 30 by way of the communication circuit 20 and the communication circuit 40, and the microcomputer 15 and the personal computer 30 are connected by way of the communication circuit 20 and the communication circuit 40.

At step 203, a cursor of the LCD 18 is indicated, the text data of the received data for the position is read out from the memory 19, and the text data is transferred by way of the communication circuit 20 and the communication circuit 40 to the personal computer 30 and written into the hard disk 32 and, subsequently, indication routine 200 terminates at the step 204.

On the other hand, in the personal computer 30, the data transferred from the portable telephone unit 10 is converted into video signals and the video signals are supplied to the CRT display 33. That is, the CRT display indicates the text of the data indicated by the cursor on the LCD 18.

If the text data is larger than the indication capacity of the CRT display 33, operation of the cursor key among the operation keys 16 is communicated through the communication circuit 20 and the communication circuit 40 to the personal computer 30, so that the indication on the CRT display 33 is updated at step 203 by the data written in the hard disk device 32, and the text indicated on the CRT display 33 is scrolled.

Thus, the text for any received data can be indicated on the CRT display 33.

The data written into the hard disk device 32 is edited by the operation of the keyboard 31 and the edited data is again written into the hard disk device 32.

When a predetermined key among the operation keys 16 of the portable telephone unit 10 is operated, the data in the hard disk device 32 is transferred by way of the communication circuit 40 and the communication circuit 20 to the memory 19. A predetermined key among the operation keys 16 is operated in a state in which the data is thus written in the memory 19, the data in the memory 19 is transmitted by way of the transmitter/receiver circuit 13 to the person with whom communication is established by way of the public network.

In this way, according to the portable telephone unit 10 described above, since the data received from the public network is transferred by way of the communication circuit 20 to the personal computer 30 and the text thereof is displayed on the CRT display 33, even if the size of the portable telephone unit 10 and the LCD 113 is reduced, the text of the received data can be read at satisfactory character size and resolution.

That is, the indication performance as the terminal equipment for the non-voice communication service such as SMC or facsimiles can be compensated to improve the user interface. On the other hand, the data can be transmitted to the person in communication at the other end of the line.

Data communication can be conducted between the portable telephone unit 10 and the personal computer 30 by disposing, for example, a connector jack of PCMCIA standard to the telephone, in which the connector jack occupies a considerably large volume compared with the portable telephone unit 10, to inhibit the size reduction of the portable telephone unit 10.

In the portable telephone unit 10 described above, since the data communication is conducted between the personal computer 30 and the telephone by way of IR light, this does not hinder the size reduction. In addition, there is no requirement for cord- or plug-connection upon data transfer and data can be transferred only by key operation, to simplify preparation and operation.

Since the communication circuit 20 is capable of both way communication, when the communication circuit 40 is connected with or incorporated in personal information equipment such as the personal computer 30 or an electronic notebook, the data received by way of the public network can be used or processed in the personal information equipment and sent back.

The communication mode may be set upon purchase of a telephone line and operation by a user or a retail vendor can be moderated by setting items that need no change during usual transportation outside portable telephone unit 10.

The personal computer 30 can be constituted as an exclusively used adapter and the CRT display 33 can be constituted by a television receiver set. The hard disk device 32 may be replaced with a memory device such as a memory card or a magneto-optic disc device. Further, the communication circuit 40 can also be connected by way of a PCMCIA of the personal computer.

According to the present invention, even if the portable telephone unit and LCD are reduced in size, the text of the data received from the public network or the like can be read at a satisfactory character size and the resolution.

Further, there is no hindrance to the size reduction as compared for example to the case of connecting a jack conforming to the PCMCIA standard to the portable telephone unit and conducting data communication between the telephone and the indication adapter. There, is also no requirement for cord- or plug-connection upon data transfer and data can be transferred merely by conducting key operation.

What is claimed is:

1. A portable telephone unit which receives and transmits electronic voice signals and non-voice data signals, comprising:

a transmitter/receiver circuit, display means for displaying at least text, including index information of a plurality of received items and a cursor adjacent to one of said plurality of received items which is to be selected, user input means including means for moving said cursor according to a first user operation, and selection means for selecting said one of said plurality of received items with said cursor adjacent thereto according to a second user operation, control means for controlling the operation of said transmitter/receiver circuit and said display means, transferring electronic data signals between said control means and said transmitter/receiver circuit, and transferring at least some of the electronic data signals corresponding to said index information of said plurality of received items to said display means, in response to which said display means displays said index information of said plurality of received items corresponding to said at least some of the electronic data signals, a light emitting device for converting the electronic data signals corresponding to the selected one of said plurality of received items, supplied from said control means, into optical signals, and a light receiving device for receiving optical signals, converting them into electronic data signals, and supplying the converted electronic data signals to said control means.

2. A portable telephone unit as defined in claim 1 wherein said control means includes memory means for storing said electronic data signals.

3. A portable telephone apparatus which receives and transmits electronic voice signals and non-voice data signals, comprising:

a portable telephone unit including a transmitter/receiver circuit, display means for displaying at least text, including index information of a plurality of received items and a cursor adjacent to one of said plurality of received items which is to be selected, user input means including means for moving said cursor according to a first user operation, and selection means for selecting said one of said plurality of received items with said cursor adjacent thereto according to a second user operation, first control means for controlling the operation of said transmitter/receiver circuit and said display means, transferring electronic data signals between said first control means and said transmitter/receiver circuit, and transferring at least some of the electronic data signals corresponding to said index information of said plurality of received items to said display means, in response to which said display means displays said index information of said plurality of received items corresponding to said at least some of the electronic data signals, a first light emitting device for converting the electronic data signals corresponding to the selected one of said plurality of received items, supplied from said first control means, into optical signals, and a first light receiving device for receiving optical signals, converting them into electronic data signals, and supplying the converted electronic data signals to said first control means, and an indication adapter including an indicator, second control means for controlling an indication on said indicator, and a second light receiving device for receiving optical signals from said first light emitting device, converting them into electronic data signals, and supplying the converted electronic data signals to said second control means.

4. A portable telephone apparatus as defined in claim 3 wherein said first control means includes first memory means for storing said electronic data signals.

5. A portable telephone apparatus as defined in claim 3 wherein said indication adapter comprises a second light emitting device for converting electronic data signals supplied from said second control means into optical signals to be sent to said first light receiving device.

* * * * *